(12) United States Patent
Ayers et al.

(10) Patent No.: US 8,953,075 B2
(45) Date of Patent: Feb. 10, 2015

(54) CMOS IMAGE SENSORS IMPLEMENTING FULL FRAME DIGITAL CORRELATED DOUBLE SAMPLING WITH GLOBAL SHUTTER

(75) Inventors: Thomas Ayers, Morgan Hill, CA (US); Frederick Thomas Brady, Webster, NY (US); Jinsuk Kang, Palo Alto, CA (US); Ping Wah Wong, Sunnyvale, CA (US)

(73) Assignee: Pixim, Inc., Mountain View, CA (US)

( * ) Notice: Subject to any disclaimer, the term of this patent is extended or adjusted under 35 U.S.C. 154(b) by 41 days.

(21) Appl. No.: 13/435,071

(22) Filed: Mar. 30, 2012

(65) Prior Publication Data
US 2013/0258151 A1 Oct. 3, 2013

(51) Int. Cl.
*H04N 5/335* (2011.01)
(52) U.S. Cl.
USPC .......................... 348/302; 348/308; 348/312
(58) Field of Classification Search
CPC ....... H04N 5/335; H04N 5/378; H04N 5/372; H04N 5/374; H04N 5/3765; H04N 3/155; H04N 3/1512; H04N 3/1575; H01L 27/14643
USPC .......................................... 348/302, 308, 312
See application file for complete search history.

(56) References Cited

U.S. PATENT DOCUMENTS

| | | | |
|---|---|---|---|
| 5,086,344 A | 2/1992 | D'Luna et al. | |
| 6,115,066 A | 9/2000 | Gowda et al. | |
| 6,320,616 B1 | 11/2001 | Sauer | |
| 6,809,666 B1 | 10/2004 | Ewedemi et al. | |
| 6,831,684 B1 | 12/2004 | Ewedemi et al. | |
| 6,963,369 B1 | 11/2005 | Olding | |
| 6,985,181 B2 | 1/2006 | Ewedemi et al. | |
| 7,265,784 B1 | 9/2007 | Frank | |
| 7,280,705 B1 | 10/2007 | Frank et al. | |
| 7,362,355 B1 | 4/2008 | Yang et al. | |
| 7,362,365 B1 | 4/2008 | Reyneri et al. | |
| 7,379,105 B1 | 5/2008 | Frank et al. | |
| 7,483,058 B1 | 1/2009 | Frank et al. | |
| 7,791,664 B1 | 9/2010 | Koifman | |
| 7,969,476 B1 | 6/2011 | Koifman | |
| 2003/0146993 A1 | 8/2003 | Kokubun et al. | |
| 2009/0256060 A1 | 10/2009 | Meynants et al. | |

OTHER PUBLICATIONS

OTHER PUBLICATIONS

M. Bigas et al., "Review of CMOS image sensor," Microelectronics Journal 37 (2006), downloaded from www.elsevier.com/locate/mejo, pp. 433-451.
Jaroslav Hynecek, "Theoretical Analysis and Optimization of CDS Signal Processing Method for CCD Image Sensors," IEEE Transactions on Electron Devices, vol. 39, No. 11, Nov. 1992, pp. 2497-2507.
Notification of Transmittal of International Search Report—Form PCT/ISA/220, International Search Report—Form PCT/ISA/210, Written Opinion of International Searching Authority—Form PCT/ISA/237, (210—Jul. 2010; 237—Jul. 2011).
Krymski, A. "Implementing Global Shutter in A 4T Pixel," located on the Internet at <http://www.imagesensors.org/Past%20Workshops/2009%20Workshop/2009%20Papers/077_paper_krymski_gs.pdf>, 2007.

*Primary Examiner* — Twyler Haskins
*Assistant Examiner* — Quang Le
(74) *Attorney, Agent, or Firm* — Rader, Fishman & Grauer PLLC

(57) ABSTRACT

An active pixel CMOS image sensor implements full frame digital correlated double sampling (CDS) with global shutter where all the pixels in the image sensor are reset at substantially the same time and all the pixels in the image sensor integrate incident light at substantially the same time and for substantially the same time duration and correlated double sampling cancellation is performed in the digital domain. In one embodiment, the image sensing device includes an array of light sensing elements, a timing and control circuit and analog-to-digital converters. The timing and control circuit is operative to reset the light sensing elements in the array and to control the array of light sensing elements to integrate incident light. The pixel reset values are cancelled from the corresponding light dependent pixel values for each of the light sensing elements to generate correlated double sampling (CDS) corrected digital output pixel values.

19 Claims, 8 Drawing Sheets

CMOS IMAGE SENSORS IMPLEMENTING FULL FRAME DIGITAL CORRELATED DOUBLE SAMPLING WITH GLOBAL SHUTTER

FIELD OF THE INVENTION

The invention relates to image sensor systems and, in particular, to active pixel CMOS image sensors implementing full frame digital correlated double sampling with global shutter.

DESCRIPTION OF THE RELATED ART

Digital image capturing devices use image sensors to convert incident light energy into electrical signals. An area image sensor includes a two-dimensional array of light sensing elements called pixels. Each pixel in the array works with the lens system to respond to incident light within a local area of the scene, and produces an electrical signal describing the local characteristics of the scene. Outputs from the light sensing elements are converted to digital form and stored digitally to form the raw data representing the scene. The raw data can be processed by an image processor to produce rendered digital images.

Image sensor designs include Charged Coupled Devices (CCD), Complementary Metal Oxide Silicon (CMOS) image sensors, and Digital Pixel System (DPS) sensors. CCD image sensors are not preferred in modern designs in part because CCDs typically consume a higher level of power, and require a relatively complex analog front end circuit. CMOS image sensors consume a lower level of power, and include built-in analog to digital converters that provide digital output pixel values. DPS image sensors are fabricated using the CMOS process, where the circuit design provides individual control of exposure for each pixel. As a result, DPS sensors can be designed to provide a high level of dynamic range performance. Furthermore, CMOS image sensors perform analog-to-digital conversion outside of the pixel array, typically using column-based analog-to-digital conversion. On the other hand, DPS image sensors implements pixel-level analog-to-digital conversion where analog-to-digital converters are provided for each pixel or a group of pixels in the pixel array to generate digital output pixel values at each pixel.

Active pixel CMOS image sensors are designed to include control transistors at each pixel for controlling photon integration in the photodetector, controlling reset, and providing a conversion gain to the pixels. Active pixel CMOS image sensors can support either rolling shutter or global shutter modes, or both. In the rolling shutter mode, each row of pixels starts exposure to light or integration of light at a later time than the pixels in the immediately preceding row. As a result, rolling shutter causes geometric distortion when the objects in the scene are moving. On the other hand, in the global shutter mode, all the pixels in the entire image sensor start and stop exposure or light integration at the same time, thus the problem of geometric distortion due to motion in the scene is avoided.

Correlated double sampling (CDS) is a method that uses a reset value and a reset plus light dependent value for each pixel to eliminate noise and non-uniformity in the pixel responses of an image sensor. In the following description, the term "light dependent pixel value" will be used to refer to "a reset plus light dependent value" of a pixel. The use of CDS enables the image sensor to achieve better signal-to-noise ratio performance. To perform CDS, a pixel is reset and either the reset voltage value or a corresponding digital value is measured, resulting in a first sample value. Then the pixel is exposed to light for a pre-determined amount of time and the pixel integrates photons from the incident light to generate a voltage value dependent on the incident light level. Either the light-dependent voltage value (including the reset voltage value) or a corresponding digital value is measured, resulting in a second sample value. In some cases, the first sample value is subtracted from the second sample value to generate the output pixel value for the pixel location. In other cases, the reset value and the light dependent pixel value can be thought of as two points on a straight line that represents the voltage of the photodiode as a function of time, where an output pixel value can be calculated based on interpolation or extrapolation along the straight line. In each case the goal is to calculate an output pixel value where pixel value variations represented by the reset value are cancelled. CDS can be implemented using analog or digital methods, and furthermore it can be designed to work on a sequential (e.g., row by row) basis or on a full frame basis. To implement full frame digital CDS, memory is required for storing at least the array of first sample values for the entire image sensor.

U.S. Pat. No. 5,086,344 issued to D'Luna et al. describes a circuit using an analog-to-digital convertor and three storage elements to perform digital CDS in an CCD image sensor. The circuit design is sequential in nature and is specifically tailored to handle pixel outputs from CCD image sensors.

U.S. Pat. No. 6,320,616 issued to Sauer describes an analog circuit in a CMOS sensor to perform analog CDS. U.S. Pat. No. 6,115,066 issued to Gowda describes digital CDS for a CMOS sensor using rolling shutter. The reset voltages and the light dependent voltages for each pixel are sampled row by row in the pixel array under the control of a timing and control logic circuit. An analog-to-digital converter (ADC) is used for each column to convert the reset and light dependent voltage values into digital form so that they are subtracted digitally.

FIG. 1 duplicates FIG. 1 of U.S. Pat. No. 6,809,666 issued to Ewedemi et al. and illustrates a block diagram of a prior art DPS image sensor designed for wide dynamic range applications. The DPS image sensor of the '666 patent uses a multi-sampling method to realize wide dynamic range performance. That is, each digital pixel in the DPS image sensor records a digital pixel value that is time stamped where the digital pixel value is recorded preferably before the pixel becomes saturated. Thus, each digital pixel value may be recorded at different exposure time or light integration time within a snapshot of a scene, depending on the light intensity impinging on that part of the DPS image sensor. The digital pixel values for the entire sensor array with the individual time stamps are extrapolated or interpolated to generate normalized pixel data representative of the captured image. The DPS image sensor of the '666 patent implements full frame digital CDS. Thus, the DPS image sensor includes a frame buffer memory for storing the reset values of the individual pixel elements so that frame based digital CDS can be performed. While DPS image sensors can provide good wide dynamic range performance, they are more expensive compared to typical CMOS sensors because of the complexity in the design.

SUMMARY OF THE INVENTION

According to one embodiment of the present invention, an image sensing device includes a two-dimensional array of light sensing elements where each light sensing element includes a photodiode and multiple control transistors. Each photodiode generates an output signal indicative of an intensity level of light impinging on the photodiode and the control transistors are configured to control reset, charge transfer and row select operations of the array of light sensing elements. The image sensing device further includes a timing and control circuit configured to generate control signals for the control transistors in each light sensing element in the array where the control signals controlling reset, light integration, charge transfer and readout operations of the array of light sensing elements; one or more analog-to-digital converters coupled to columns of the array of light sensing elements and configured to digitize output signals read out from the array of light sensing elements to generate digital output pixel values; and a memory configured to store at least one frame of digital output pixel reset values. In operation, the timing and control circuit is operative to reset the light sensing elements in the array at substantially the same time and to read out pixel reset values associated with the light sensing elements, the pixel reset values being stored in the memory; and the timing and control circuit is further operative to control the array of light sensing elements to integrate incident light at substantially the same time and for substantially the same time duration and to read out light dependent pixel values associated with the light sensing elements. Furthermore, the pixel reset values are cancelled from the corresponding light dependent pixel values for each of the light sensing elements in the array to generate correlated double sampling (CDS) corrected digital output pixel values.

According to another aspect of the present invention, a method in an image sensing device includes providing a two-dimensional array of light sensing elements where each light sensing element includes a photodiode and multiple control transistors and each photodiode generates an output signal indicative of an intensity level of light impinging on the photodiode and the control transistors are configured to control reset, charge transfer and row select operations of the array of light sensing elements; resetting the array of light sensing elements at substantially the same time; reading out the pixel reset values associated with the light sensing elements; storing the pixel reset values; integrating charges at the photodiodes of the array of light sensing elements indicative of incident light at substantially the same time and for substantially the same time duration; reading out the light dependent pixel values associated with the light sensing elements; and cancelling the pixel reset values from the corresponding light dependent pixel values for each of the light sensing elements in the array to generate correlated double sampling (CDS) corrected digital output pixel values.

The present invention is better understood upon consideration of the detailed description below and the accompanying drawings.

DETAILED DESCRIPTION OF THE PREFERRED EMBODIMENTS

Figure 1:
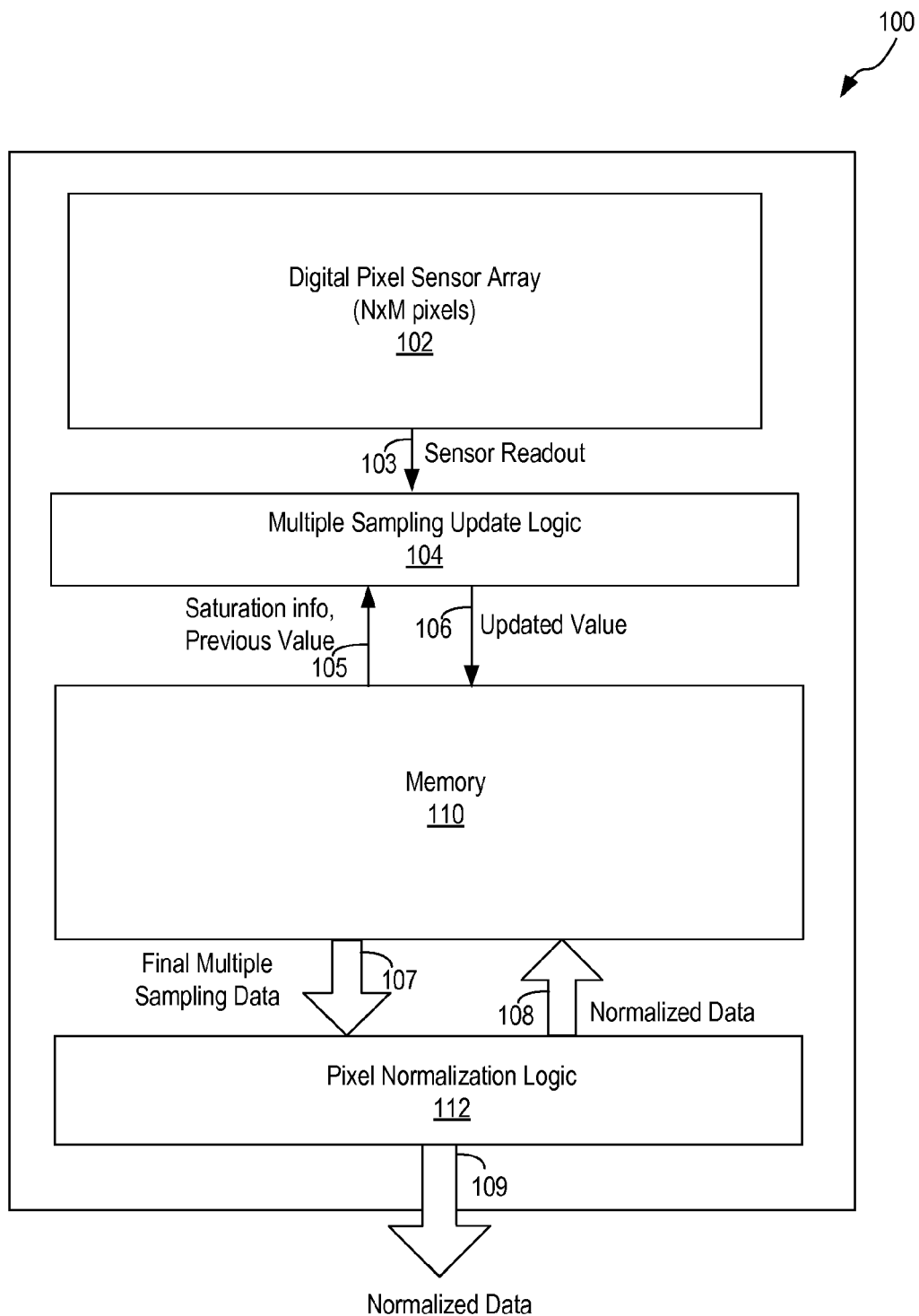
FIG. 1 duplicates FIG. 1 of U.S. Pat. No. 6,809,666 issued to Ewedemi et al. and illustrates a block diagram of a prior art DPS image sensor.

In accordance with the principles of the present invention, an active pixel CMOS image sensor implements full frame digital correlated double sampling (CDS) with global shutter. To implement full frame digital correlated double sampling with global shutter, all the pixels in the image sensor are reset at substantially the same time and all the pixels in the image sensor integrate incident light at substantially the same time and for substantially the same time duration and correlated double sampling cancellation is performed in the digital domain. In one embodiment, the image sensor includes an array of pixel elements and a timing and control logic circuit. The timing and control logic circuit in the image sensor controls the reset, the beginning and the end of exposure or light integration for all pixel elements so that the reset period and exposure period occur at substantially the same time and for substantially the same duration for all the pixels. The pixel reset values of all pixels and the light dependent pixel values of all pixels are converted to digital values by one or more analog to digital converters outside of the pixel array. The pixel reset value is subtracted from the light dependent pixel value for each respective pixel in digital domain to generate a digital correlated double sampling (CDS) corrected output pixel value for each pixel. In this manner, pixel array non-uniformity and noise are cancelled or removed from the captured image data.

In embodiments of the present invention, the CMOS image sensor includes a memory for storing the pixel reset values and/or the light dependent pixel value. The memory, also referred to as a "frame buffer", may be formed on the same integrated circuit as the pixel array. Alternately, the frame buffer or memory may be formed on an integrated circuit separated from the integrated circuit on which the pixel array is formed. The level of integration of the memory with the array of pixel elements of the CMOS sensor is not critical to the practice of the present invention. In some embodiments, a CDS control and cancellation circuit may be included in the CMOS sensor to control the CDS operation and to generate the digital CDS corrected output pixel values. The CDS control and cancellation circuit may be integrated on the same integrated circuit as the pixel array or may be formed on a separate integrated circuit.

In the present description, the term "light dependent pixel value" will be used to refer to a pixel value including the reset value and the light dependent value for a pixel. That is, the "light dependent pixel value" refers to "a reset plus light dependent pixel value" of a pixel for simplicity. In the present description, the term "full frame digital CDS with global shutter" refers to resetting the entire array of pixels in an image sensor at the same time to generate the pixel reset values, integrating incident light at the entire pixel array at the same time and for the same exposure time duration to generate light dependent pixel values for all of the pixels, and performing CDS cancellation using digital pixel reset values and digital light dependent pixel values.

In the present description, the terms "exposure" and "light integration" refer to the action of the photodetector or photodiode to integrate photons from incident light. The "exposure period" or "exposure time" does not necessarily refer to the time period when the photodetector is exposed to light. In some cases, such as when electronic shutter is used, the pixel array may be exposed to light but not yet integrating photons. In the present description, a pixel element or a pixel array is said to be "exposed to light" or "integrating incident light" when the photodetector of the pixel element is integrating photons from the incident light.

Figure 2:
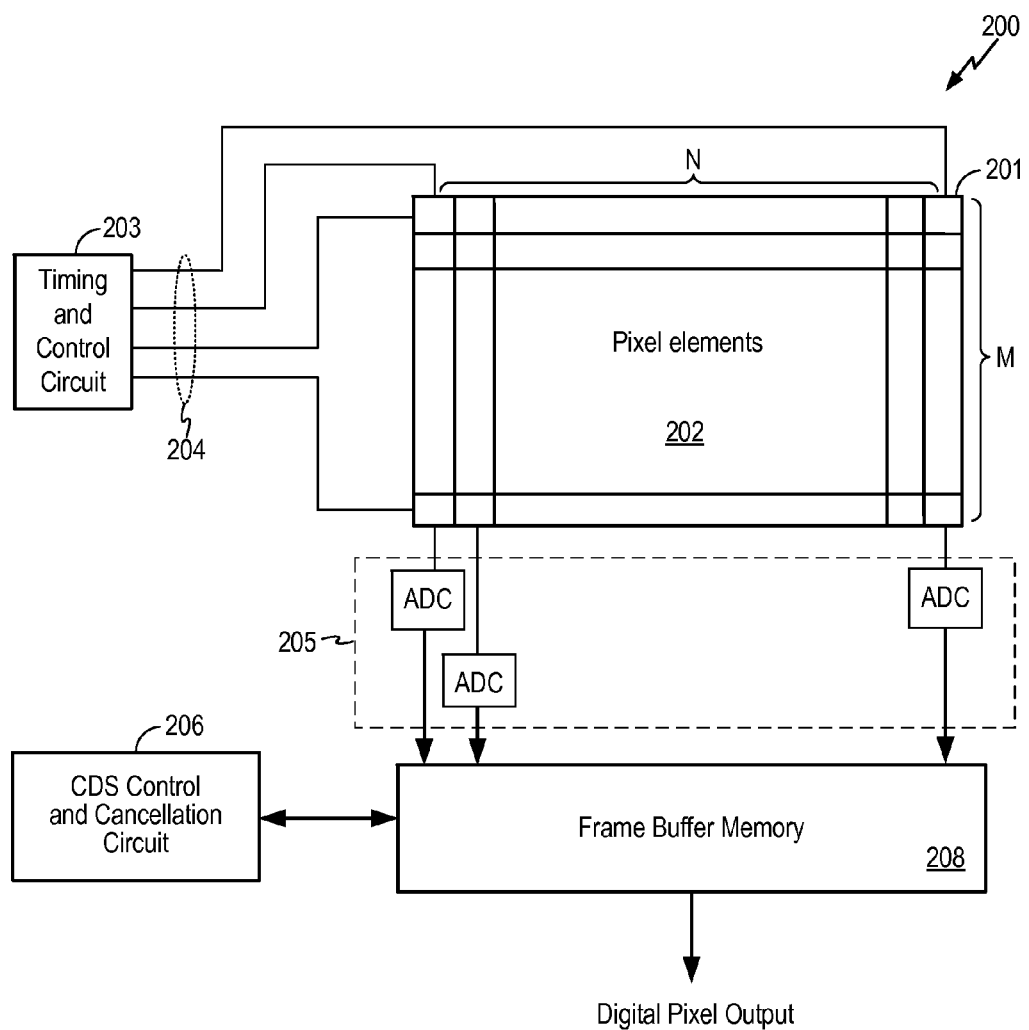
FIG. 2 illustrates an active pixel CMOS image sensor implementing full frame digital CDS and global shutter according to one embodiment of the present invention.

FIG. 2 illustrates an active pixel CMOS image sensor implementing full frame digital CDS with global shutter according to one embodiment of the present invention. Referring to FIG. 2, an active pixel CMOS image sensor 200 ("image sensor 200") includes a two-dimensional array 201 of light sensing elements 202, also referred to as "pixel elements." In the present embodiment, the pixel elements 202 are arranged in a rectangular array of M (height) by N (width) pixels. Each pixel element 202 includes a photodiode and multiple control transistors connected in a configuration to control the reset, charge transfer and readout operation of the pixel element. In embodiments of the present invention, the pixel element can be configured using any active pixel architecture, presently known or to be developed, having reset, charge transfer and row select controls. Furthermore, the image sensor can be formed using various pixel cell design, including the 4-transistor or 5-transistor active pixel cell architecture. Exemplary active pixel architectures are described in Bigas et al., "Review of CMOS image sensors," Microelectronics Journal, 2006.

In embodiments of the present invention, image sensor 200 can be implemented as a monochrome image sensor or a color image sensor. To implement a color image sensor, an array of selectively transmissive filters is superimposed and in registration with each of the pixel elements. The array of selectively transmission filters includes at least a first group of filters associated with a first group of photodiodes for capturing a first color spectrum of visible light and a second group of filters associated with a second group of photodiodes for capturing a second color spectrum of visible light. Construction of color image sensors is known in the art. In some embodiments, the pixel elements are coated with individual RGB color filters arranged in a Bayer pattern. A demosaicing algorithm is used in the image processing pipeline to produce color images based on pixel data obtained from the color image sensor. In other embodiments, the pixel elements are coated with CMY color filters or other color filter patterns, in a Bayer pattern or other color filter configurations.

Image sensor 200 further includes a timing and control circuit 203 for controlling the reset, start and stop light integration, charge transfer and readout of the pixel array 201. The timing and control circuit provides control signals 204 to the controls transistors in the pixels 202 of the pixel array 201. Image sensor 200 includes one or more analog-to-digital converter (ADC) circuit 205 for digitizing the pixel voltage value from the pixel array 201. In the present embodiment, image sensor 200 implements column-based analog-to-digital conversion where one ADC is provided for each column of pixels in the pixel array. In other embodiments, other ADC configuration may be used. For instance, one ADC circuit may be coupled to multiple columns of the pixel array. Alternately, each column of the pixel array may be coupled to multiple ADC circuits. The number of ADCs provided for each column of the pixel array and the configuration of the ADCs is a matter of design choice made based on performance factors including conversion speed of the ADC, the size of the pixel array, settling time of signals in the pixel array, the minimum exposure time of the pixels, and other factors.

The pixel values digitized by the ADC circuits 205 are provided to a frame buffer memory 208 to be stored or processed. Frame buffer memory 208 has enough storage capacity to store at least one full frame of pixel data, that is pixel data from all M×N pixels of the pixel array 201. For example, a full frame of pixel reset values can be stored in frame buffer memory 208 and can be read out for use in CDS cancellation or to be further processed.

In the present embodiment, image sensor 200 further includes a CDS control and cancellation circuit 206. CDS control and cancellation circuit 206 generates control signals to the frame buffer memory to retrieve stored pixel values and to perform cancellation of the pixel reset values from the light dependent pixel values after light integration of the pixel array 201, as will be described in more detail below. In embodiments of the present invention, the CDS cancellation step includes a subtraction step where the pixel reset value is subtracted from the corresponding light dependent pixel value, or an interpolation or extrapolation step where the pixel reset value and the light dependent pixel value are used as two points on a straight line representing voltage of the photodiode as a function of time to interpolate or extrapolate the desired CDS corrected pixel value. The CDS control and cancellation circuit 206 may be implemented either by software or hardware. Examples of a CDS control and cancellation circuit include a digital cancellation circuit, an FPGA, an ASIC, a processor with embedded software, software running on a computer, and other suitable digital computing means.

As thus configured, image sensor 200 performs digital CDS with global shutter where at least the digital pixel reset values for the pixel array 201 are stored in the frame buffer memory 208. The stored reset values can then be used to cancel out the noise components from the light dependent pixel values. In one embodiment, digital reset values of the pixels after the reset operation of the pixel elements 202 are stored in the frame buffer memory 208. Then, when the light dependent pixel values are generated after the predetermined light integration time, the CDS control and cancellation circuit 206 operates to retrieve the corresponding reset values from the frame buffer memory 208 and to perform a cancellation calculation between the light dependent pixel value and the reset value for each pixel in the digital domain to generate a CDS corrected digital output pixel value for each pixel. In one embodiment, the CDS corrected digital output pixel values are stored back in the frame buffer memory 208 to be read out at a later time. In another embodiment, the CDS corrected digital output pixel values are sent to the output of the image sensor 200 without being stored back in the frame buffer memory 208. When the CDS corrected digital output pixel values are stored in the frame buffer memory 208, the stored data can be used in other image processing functions, such as multiple frame processing. Examples of multi-frame processing include motion estimation, temporal noise filtering, image stabilization, high resolution multi-frame image reconstruction and other techniques.

Figure 3:
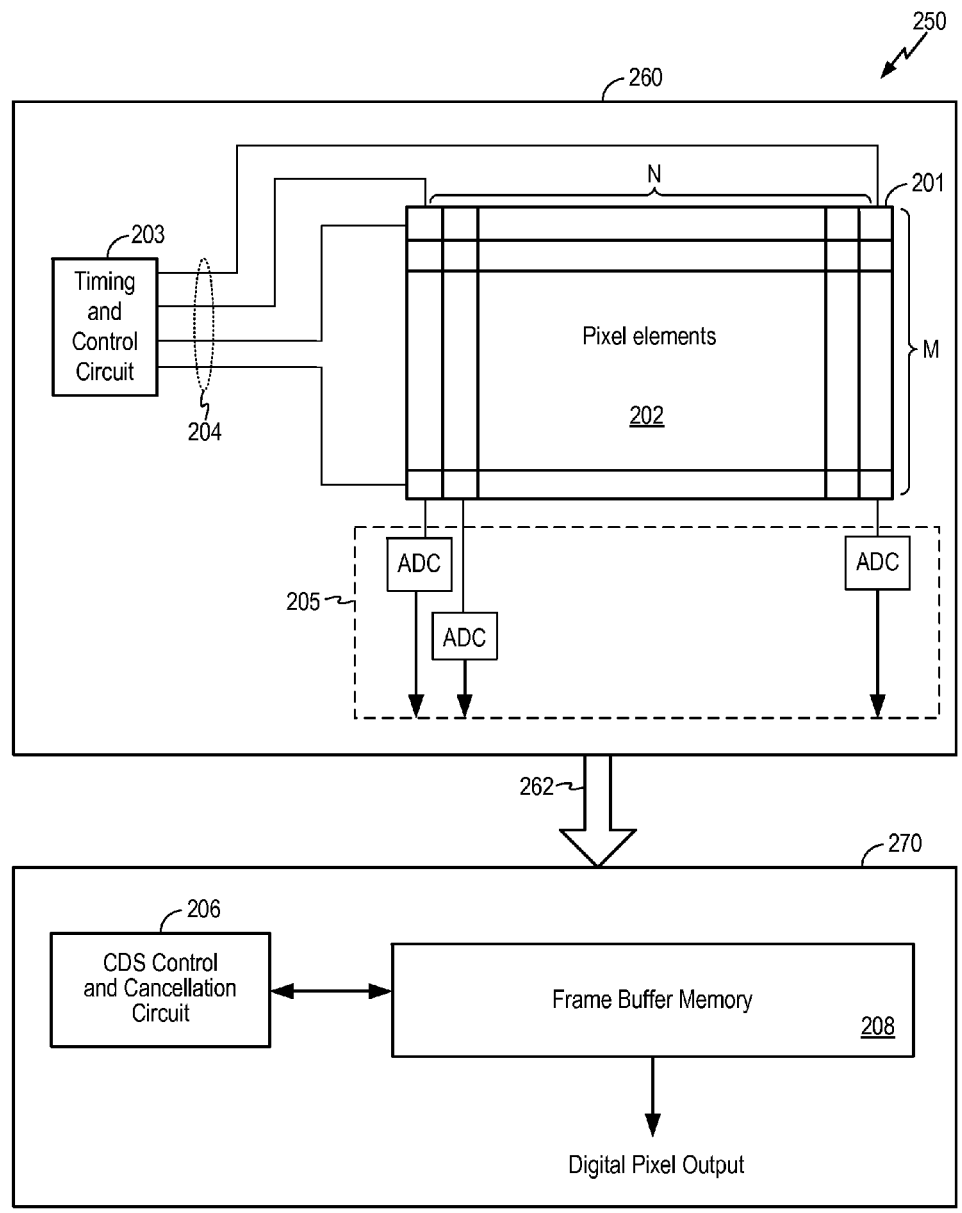
FIG. 3 illustrates an active pixel CMOS image sensor implementing full frame digital CDS and global shutter according to an alternate embodiment of the present invention.

In embodiments of the present invention, the image sensor 200, including the frame buffer memory 208 and the CDS control and cancellation circuit 206 may be formed as a monolithic integrated circuit. When both the pixel array 201 and the memory 208 are formed on the same integrated circuit, data transmission bottleneck can be avoided and image sensor 200 can be operated at a high data rate. In other embodiments of the present invention, the image sensor 200, including the analog-to-digital converters 205, are formed on a separate integrated circuit from the frame buffer memory 208. FIG. 3 illustrates an active pixel CMOS image sensor implementing full frame digital CDS and global shutter according to an alternate embodiment of the present invention. In the embodiment illustrated in FIG. 3, an image sensor 250 includes a first integrated circuit 260 having formed thereon the pixel array 201, the timing and control circuit 203 and the bank of ADC circuits 205. The image sensor 250 further includes a second integrated circuit 270 having formed thereon the frame buffer memory 208 and the CDS control and cancellation circuit 206. Digital pixel reset values and digital light dependent values are transmitted from the ADC circuits 205 of the pixel array integrated circuit 250 via a digital interface to the memory integrated circuit 270 for storage and processing.

FIG. 2 illustrates an image sensor 200 formed on a single integrated circuit, whereas FIG. 3 illustrates an image sensor 250 formed using two separate integrated circuits. The degree of integration of the image sensor is not critical to the practice of the present invention. The monolithic image sensor shown in FIG. 2 and the dual-integrated-circuit image sensor shown in FIG. 3 are illustrative only and not intended to be limiting. The image sensor of the present invention can be formed using one or more integrated circuits.

Figure 4:
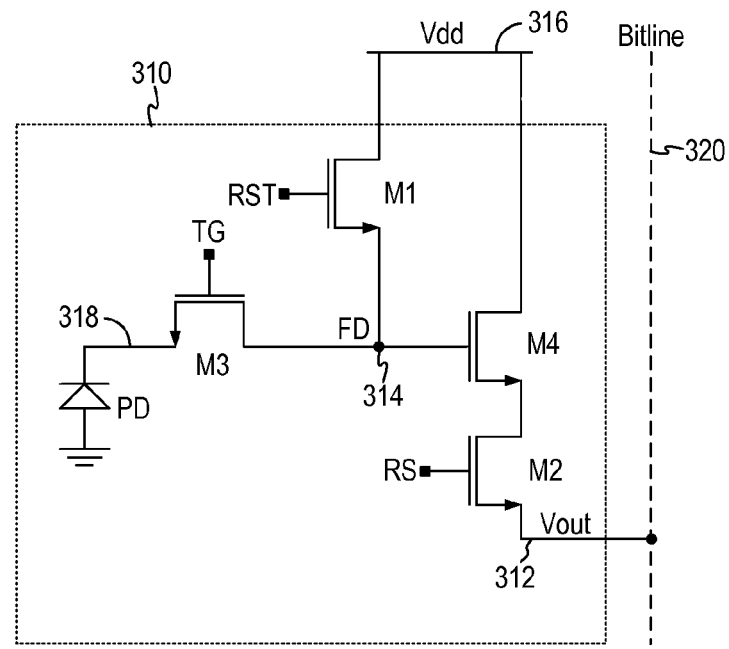
FIG. 4 is a circuit diagram of a 4-transistor (4T) active pixel cell which can be used in the CMOS image sensor of FIGS. 2 and 3 according to one embodiment of the present invention.

FIG. 4 is a circuit diagram of a 4-transistor (4T) active pixel cell which can be used in the CMOS image sensor of FIGS. 2 and 3 according to one embodiment of the present invention. Referring to FIG. 4, a pixel element 310 implementing a 4T active pixel design includes a photodiode (PD) and four control transistors M1 to M4. In the present embodiment, control transistors M1 to M4 are NMOS transistors and operate in concert to control the reset, charge transfer and row select operations of the pixel element. More specifically, transistor M1 is the reset transistor controlled by a reset signal (RST) and functions to reset the photodiode PD when the reset signal is asserted. Transistor M2 is the row select transistor controlled by a row select signal (RS) and functions to control the readout of the pixel value from a floating diffusion FD (node 314) to an output voltage node 312. Transistor M3 is the transfer gate transistor controlled by a transfer signal (TG) and functions to transfer charges on the photodiode PD to the floating diffusion (node 314) when the transfer signal is asserted. Finally, transistor M4 is gated by the floating diffusion FD (node 314) to sense the charge transferred from the photodiode PD and to pass the output signal from the floating diffusion to the row select transistor M2.

In the 4T active pixel element 310, when both the reset signal RST and the transfer gate signal TG are set to a logical high level, the photodiode PD is reset to a level determined by its pinning voltage, which is typically in the 0.8 to 1.5 volts range depending on the fabrication technology. The pinning voltage is typically higher than a low voltage value which is close to zero volt. Other voltage values may be used as the reset voltage value dependent on the circuit technology and implementation. When signal TG goes low and the transfer gate transistor M3 is turned off, the photodiode PD is isolated from the rest of the circuit, and the photodiode is in a state operative to integrate photons from the incident light, i.e. the photodiode is charged in response to incident light. Meanwhile, the reset voltage value, present on the floating diffusion FD node 314, can be read out of the pixel element. To read the reset voltage value, the reset signal RST is switched low and reset transistor M1 is turned off; meanwhile, the row select signal RS is switched high and the row select transistor M2 is turned on to connect the reset voltage at the floating diffusion FD, through transistor M4, to the output voltage node 312 as the output pixel voltage Vout. The output pixel voltage Vout is connected to an analog-to-digital converter (ADC) (not shown) formed outside of the pixel array to digitize the sensed voltage value. The ADC converts the output pixel voltage Vout into digital form, resulting in a digital pixel reset value for the pixel element.

At the end of light integration, the charge at the photodiode can be read. To do so, the transfer gate signal TG is turned high (on) to assert the transfer gate transistor M3 to transfer the charge from the photodiode PD to the floating diffusion FD. The signal TG is turned low to turn off the transfer gate transistor M3 after the charge has been transferred so as to isolate the floating diffusion from the photodiode. Readout of the light dependent pixel voltage can proceed by setting the row select signal RS to high to turn on row select transistor M2. The pixel voltage value is converted by an ADC (not shown) to produce a light dependent pixel value. As described above, when CDS is implemented, the pixel reset value previously recorded can then be cancelled from the light dependent pixel value to generate a corrected digital output pixel value without noise or errors due to non-uniformity of the pixel elements in the array.

Figure 5:
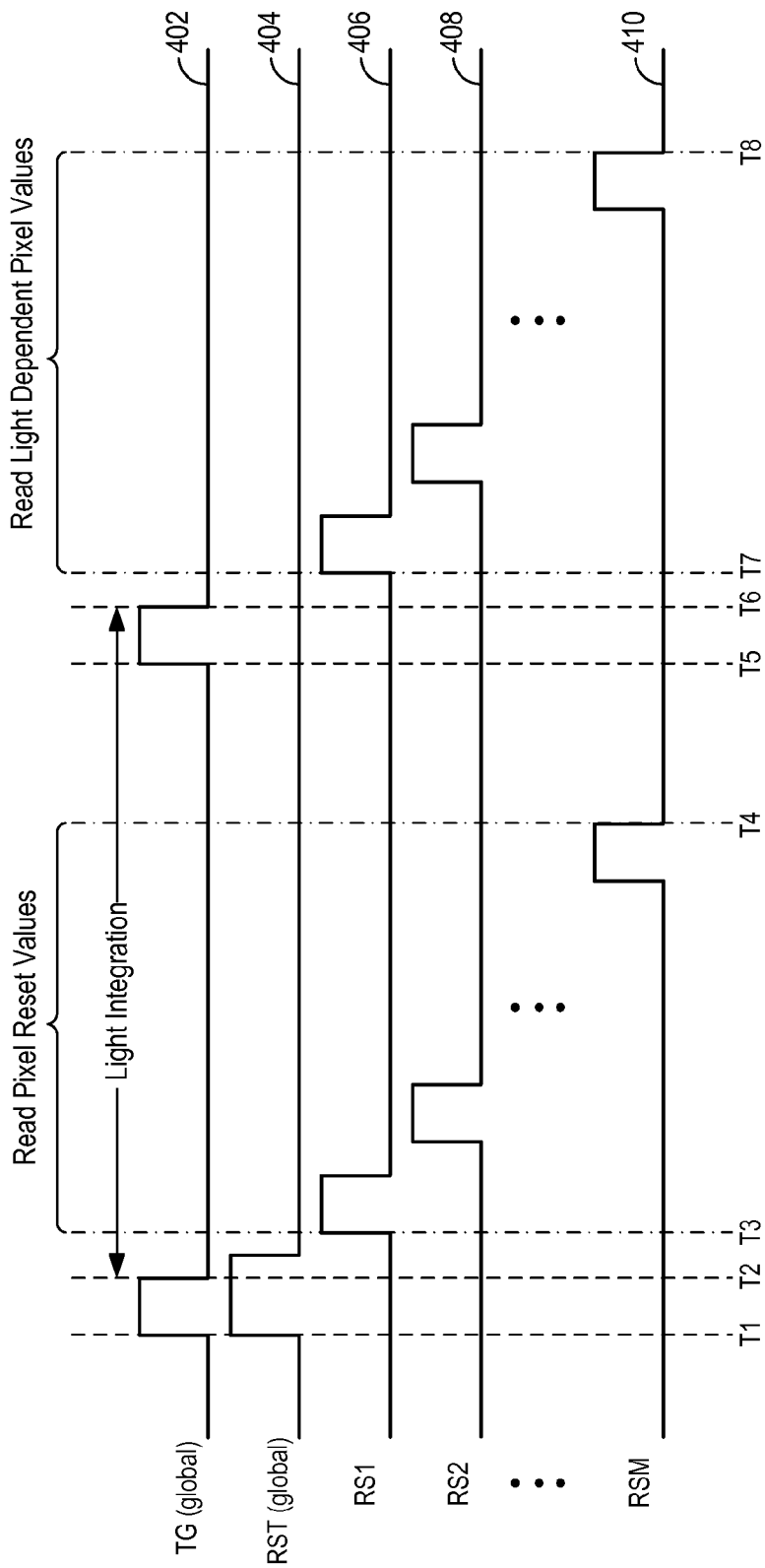
FIG. 5 is a timing diagram illustrating control signals for a CMOS sensor with 4T pixels for implementing full frame digital CDS with global shutter according to one embodiment of the present invention.

To support full frame digital CDS with global shutter, all the pixels must be reset at substantially the same time, and all the pixels must start integration of light at substantially the same time, and complete light integration at substantially the same time. FIG. 5 is a timing diagram illustrating control signals for a CMOS sensor with 4T pixels for implementing full frame digital CDS with global shutter according to one embodiment of the present invention. Referring to FIG. 5, at time T1, both the transfer gate signal TG and the reset signal RST go high for all the pixel elements in the pixel array. The transfer gate transistor M3 and the reset transistor M1 for all of the pixel elements are thus turned on. Because the transfer gate signal TG and the reset signal RST are global signals applied to all the pixels in the pixel array, all the pixels in the image sensor are thus reset at substantially the same time. Because the transfer gate signal TG and the reset signal RST are global signals supplied to all the pixels, the signals may be coupled to repeater circuits in the image sensor to boost the signal strength and to ensure that signal transitions arrive at the control transistors of each pixel at substantially the same time to support global shuttering.

At time T2, the transfer gate signal TG transitions to low to turn off the transfer gates transistors M3 at all the pixels. The reset signal RST also transitions to low a short time after T2 to turn off the reset transistor M1. Time T2 is the beginning of the exposure time or light integration time for all the pixels in the sensor, where the photodiodes in all the pixels are charged up in response to incident light. At time T5, the transfer gate signal TG goes high again to turn on the transfer gate transistor M3 for charges to transfer from the photodiode (node 318) to the floating diffusion (node 314). When the charge transfer is completed, the transfer gate signal TG goes low at time T6 to shut off the transfer gates transistor M3. As a result, the time duration between T2 and T6 is the exposure time or light integration time for all the pixels in the sensor.

While the pixels are integrating incident light, the timing and control circuit operates to enable the readout of the reset voltage values which have been stored on the floating diffusion from the reset operation. Starting at time T3, the row select signal RS 1 for the first row of pixels goes high to connect the reset voltage values of the pixels in the first row of the pixel array to the ADC circuits connected to the pixel column. The reset voltage values are converted by the ADC to digital form, resulting in the digital pixel reset values for the first row of the sensor. After the first row is read out, the timing and control circuit sets the row select signal RS2 for the second row of pixels to a high level, which enables the reset voltage values of the pixels in the second row to be read out and converted to digital form. Between time T3 and T4, the image sensor operates in a similar fashion on a row by row basis until the reset voltage values for all of the pixels in the pixel array are read out.

Then, after the exposure period (time T2 to T6) of the pixels in the image sensor is completed and after the charges indicative of the incident light have been transferred to the floating diffusion (node 314) at the end of the exposure time T6, a readout procedure similar to the readout procedure of the pixel reset values is performed between time T7 and T8 to read out the light dependent pixel voltage values. More specifically, between time T7 and T8, the light dependent voltage values for all of the pixels are read out one row at a time and are digitized by the column ADCs to generate digital pixel values.

As a result of the reset readout procedure in the time duration between time T3 and T4, as well as the light dependent readout procedure in the time duration between time T7 and T8, two frames of digital pixel data are generated by the image sensor. The first frame of digital pixel data represents the reset values, whereas the second frame of pixel data represents the light dependent pixel values (including the reset values). In embodiments of the present invention, the image sensor stores at least one frame of pixel reset data in a frame buffer memory, which can be formed on the same integrated circuit as the pixel array or on a separate integrated circuit. With the stored pixel reset values, CDS can be performed to cancel the reset values from the corresponding light dependent pixel values to generate the corrected digital output pixel values, as described above.

Figure 6:
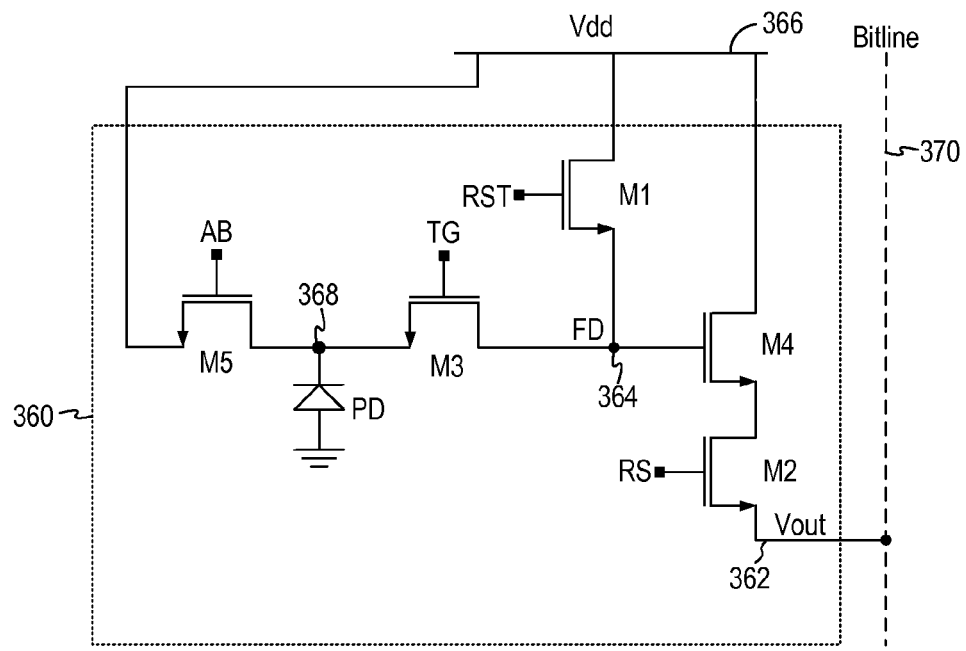
FIG. 6 is a circuit diagram of a 5-transistor (5T) active pixel cell which can be used in the CMOS image sensor of FIGS. 2 and 3 according to one embodiment of the present invention.

FIG. 6 is a circuit diagram of a 5-transistor (5T) active pixel cell which can be used in the CMOS image sensor of FIGS. 2 and 3 according to one embodiment of the present invention. Referring to FIG. 6, a pixel element 360 implementing a 5T active pixel design includes a photodiode (PD) and four control transistors M1 to M5. In the present embodiment, control transistors M1 to M4 are NMOS transistors and operate in concert to control the reset, charge transfer, row select and anti-blooming operations of the pixel element. More specifically, transistor M1 is the reset transistor controlled by a reset signal (RST) and functions to reset the photodiode PD when the reset signal is asserted. Transistor M2 is the row select transistor controlled by a row select signal (RS) and functions to control the readout of the pixel value from a floating diffusion FD (node 364) to an output voltage node 362. Transistor M3 is the transfer gate transistor controlled by a transfer signal (TG) and functions to transfer charges on the photodiode PD to the floating diffusion (node 364) when the transfer signal is asserted. Transistor M4 is gated by the floating diffusion FD (node 364) to sense the charge transferred from the photodiode PD and to pass the output signal from the floating diffusion to the row select transistor M2. Finally, transistor M5 is the anti-blooming transistor controlled by an anti-blooming (AB) signal and functions to reset the photodiode when the anti-blooming signal is asserted.

The construction of the 5T pixel cell is similar to the 4T pixel cell with the addition of transistor M5 and the anti-blooming signal AB. The anti-blooming transistor M5 connects the photodiode PD to the positive power supply Vdd voltage. The purpose of the anti-blooming transistor M5 is to reset the photodiode for global shutter operation. In the global shutter operation mode of the 5T cell, the reset gate is only used to reset the floating diffusion FD (node 364), which allows timing control to be more flexible. By using the reset gate to only reset the floating diffusion FD, the pixel element realizes improved performance in preventing charge from leaking into the floating diffusion FD. Other than the reset and anti-blooming operation, the 5T pixel cell operates in a similar manner as the 4T pixel cell in integrating incident light and in reading out pixel voltage value stored at the floating diffusion.

Figure 7:
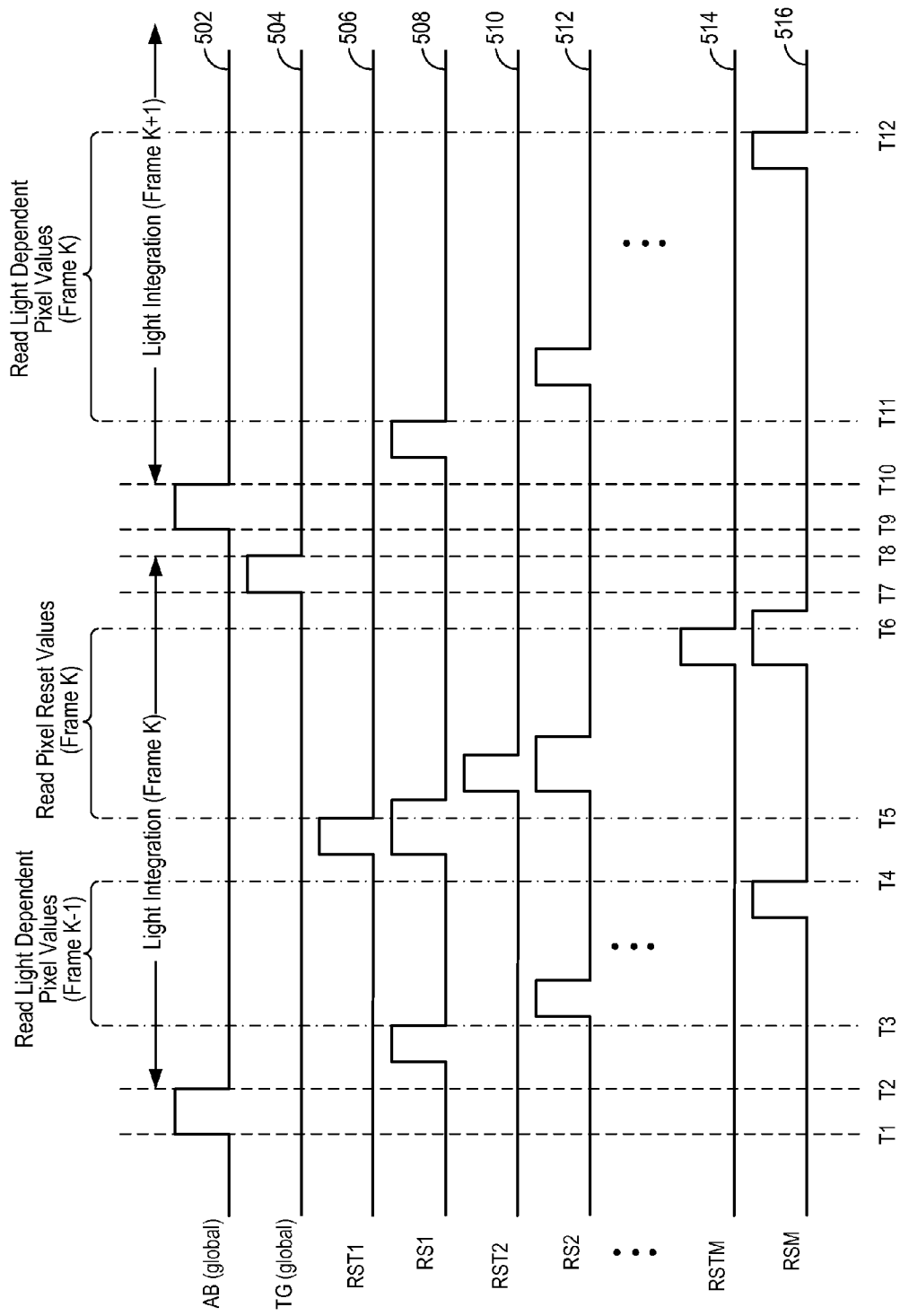
FIG. 7 is a timing diagram illustrating control signals for a CMOS sensor with 5T pixels for implementing full frame digital CDS with global shutter according to one embodiment of the present invention.

To support full frame digital CDS with global shutter, all the pixels must be reset at substantially the same time, and all the pixels must start integration of light at substantially the same time, and complete light integration at substantially the same time. FIG. 7 is a timing diagram illustrating control signals for a CMOS sensor with 5T pixels for implementing full frame digital CDS with global shutter according to one embodiment of the present invention. Referring to FIG. 7, at time T1, the AB signal transitions high to turn on the anti-blooming transistor M5 for all the pixel elements in the pixel array. In this manner, all the pixels in the image sensor are reset at substantially the same time.

When the AB signal transitions to low (off) at time T2, the pixel array starts light integration for frame K and the photodiode charges in response to incident light. The pixel array integrates light for frame K until time T8. During the integration time for image frame K, the light dependent pixel values for the previous frame (K−1) are being read out from time T3 to T4. Then, prior to the end of light integration (time T8), a rolling reset and read is performed on a row by row basis from time T5 to T6. The reset signal RST1 and the row select signal RS1 for pixel row 1 are asserted to reset the floating diffusion of the pixel. At time T5, the reset signal RST1 goes low to isolate the floating diffusion while the row select signal RS1 remains asserted and the reset values for row 1 is read. Pixels at succeeding rows are reset and read under the control of the RSTx and RSx signals (where x=1, 2, . . . , M) which are asserted on a row by row basis. The rolling reset and read is performed to keep the integration time for the dark current, i.e., the time between resetting the floating diffusion and readout of light dependent pixel values, substantially identical down the array of pixels. As a result, dark current shading (i.e. unevenness) in the pixel reset values is prevented. It is advantageous to perform the rolling reset as late as possible during the exposure time period.

After the reset/read step is completed, the transfer gate signal TG transitions to high at a time T7. The transfer gate signal TG is a global signal applied to all pixels and assertion of the TG signal causes the transfer gate transistor M3 for all the pixels to turn on. The charge transfer operation from the photodiodes to the floating diffusion for each pixel is thus initiated. At time T8, the TG signal transitions to low and the light integration period ends for all the pixels. Since the charges collected by the photodiodes have been transferred to the floating diffusion FD for all pixels, the anti-blooming signal AB can be asserted at time T9 to reset all the photodiodes and start light integration for the next frame. The light integration period for frame K+1 starts when the anti-blooming signal AB is deasserted at a time T10.

While the pixels are integrating light for the next frame (frame K+1), the light dependent pixel values for the previous frame (frame K) can be read out. A rolling read sequence between time T11 and T12 is used for reading out the light dependent pixel values. The row select signals RSx (x=1, 2, . . . , M) are turned on sequentially to enable the read out process on a row by row basis. After the entire image frame has been read, CDS cancellation of the pixel reset values previously read out can be performed using one or more of the methods described above.

In embodiments of the present invention, the image sensor implements full frame digital correlated double sampling (CDS) with global shutter and active reset operation. Active reset operation involves monitoring the reset level of each pixel, such as by use of an active reset circuit. The active reset circuit operates to adjust the bias conditions of each reset transistor to minimize the variation of the reset level between pixels.

In embodiments of the present invention, the image sensor can be implemented using 4T or 5T active pixel cell architecture described above. Furthermore, in embodiments of the present invention, the active reset circuit is part of the timing and control logic circuit. Circuits and methods for performing active reset are known in the art. In embodiments of the present invention, the image sensor implements active reset using any one of the circuits and methods, currently known or to be developed. The following description provides examples of active reset circuits and methods which can be employed in the image sensor of the present invention. The examples provided herein are illustrative only and not intended to be limiting.

Figure 8:
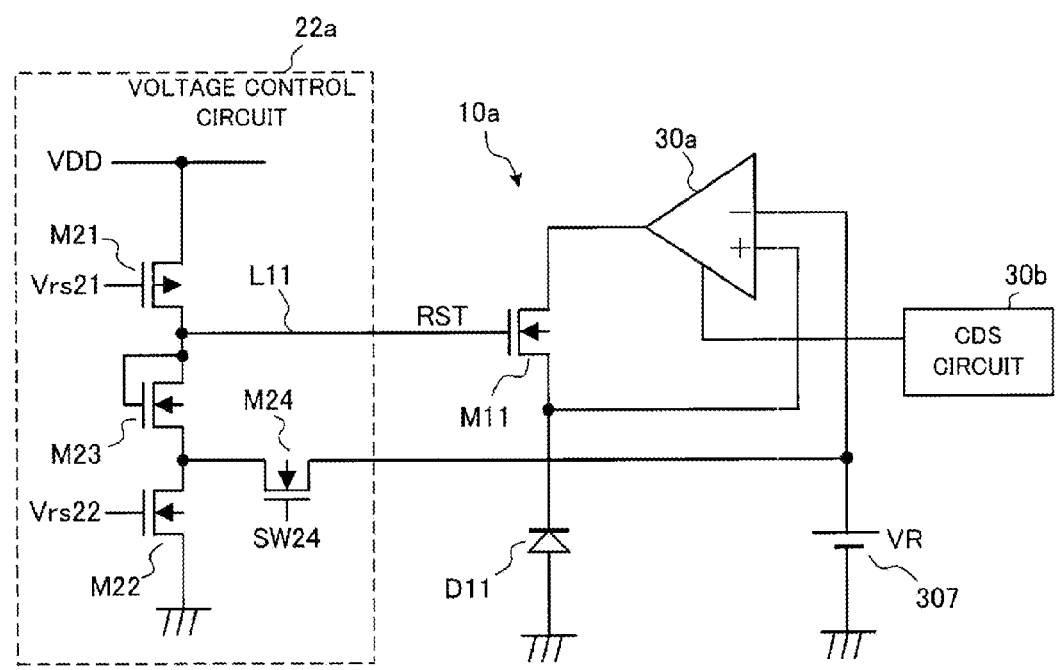
FIG. 8 duplicates FIG. 7 of U.S. Patent Publication No. US2003/0146993 to Kokubun and illustrates an example of voltage control circuit used for active reset of the photodiode.

FIG. 8 duplicates FIG. 7 of U.S. Patent Publication No. US2003/0146993 to Kokubun and illustrates an example of voltage control circuit used for active reset of the photodiode. More specifically, U.S. patent application US2003/0146993 by Kokubun et al. discloses a voltage control circuit that controls the potential of the gate of the reset transistor, thereby controlling the cutoff frequency of a low-pass filter formed by the ON-state resistance of the reset transistor and the parasitic capacitance produced at the cathode of the photodiode.

Figure 9:
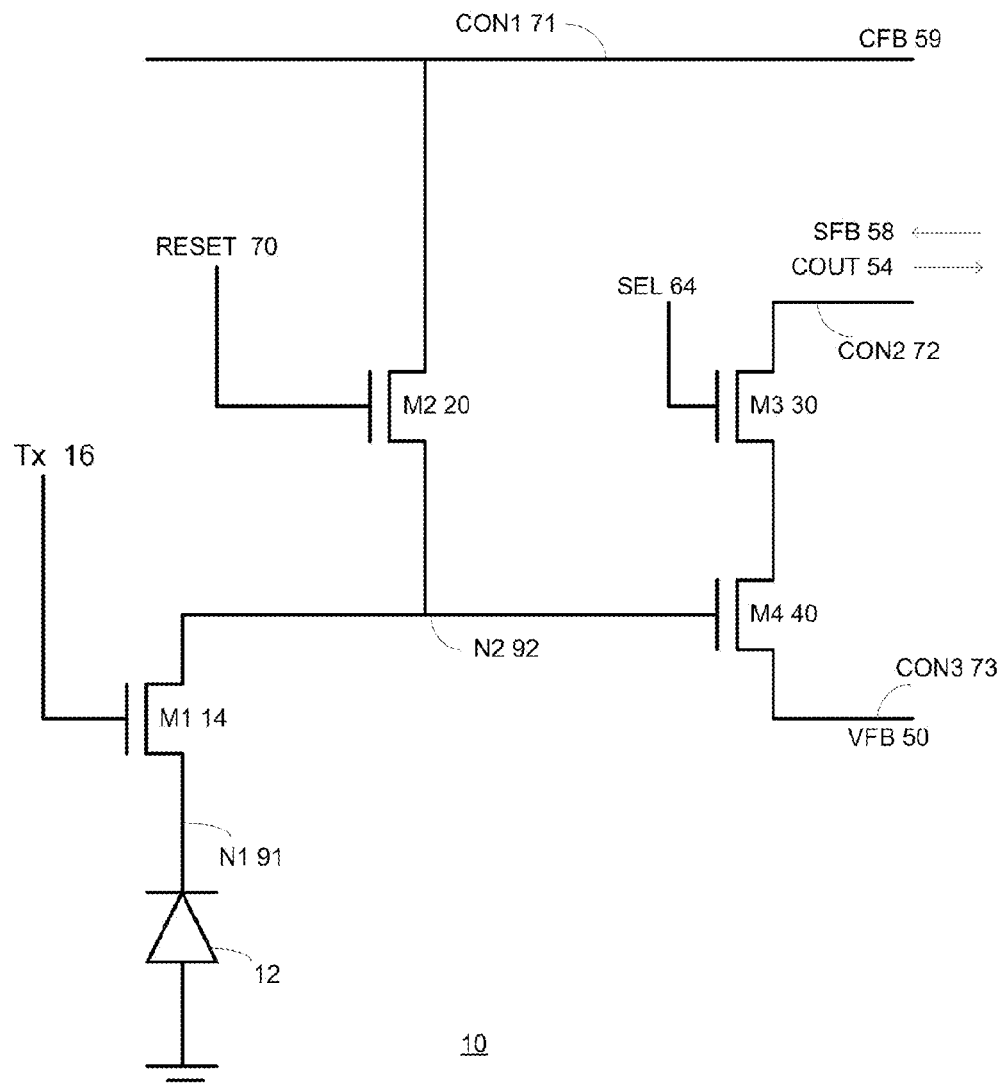
FIG. 9 duplicates FIG. 1 of U.S. Pat. No. 7,791,664 and illustrates an example of active reset using a feedback controlled pixel.

U.S. Pat. Nos. 7,969,476 and 7,791,664, both by Koifman, disclose different methods of active reset employing feedback control. Active reset employing feedback control uses a fixed reference current and senses the difference between the fixed reference current and the pixel output current to provide a feedback to the pixel based on the difference. FIG. 9 duplicates FIG. 1 of U.S. Pat. No. 7,791,664 and illustrates an example of active reset using a feedback controlled pixel. Referring to FIG. 9, conductor 1 (CON1 71) is connected to a drain of transistor M2 20 and conveys a current feedback signal CFB 59. A pixel output signal from the drain of transistor M3 30 on conductor CON2 72 can be used to provide a feedback signal SFB 58. A conductor CON3 73 connected to the source of transistor M4 40 can convey a voltage feedback signal VFB 50. All three feedback signals can affect operation of the pixel by affecting the voltage level at the node N2 92.

The above detailed descriptions are provided to illustrate specific embodiments of the present invention and are not intended to be limiting. Numerous modifications and variations within the scope of the present invention are possible. For example, different active pixel cell designs may be used in an image sensor to achieve full frame digital CDS with global shutter. Furthermore, different pixel value readout methods and timings may be used. The present invention is defined by the appended claims.

We claim:

1. An image sensing device comprising:
a two-dimensional array of light sensing elements, each light sensing element comprising a photodiode and a plurality of control transistors, each photodiode generating an output signal indicative of an intensity level of light impinging on the photodiode, and the plurality of control transistors being configured to control reset, charge transfer and row select operations of the array of light sensing elements;
a timing and control circuit configured to generate control signals for the plurality of control transistors in each light sensing element in the array, the control signals controlling reset, light integration, charge transfer and readout operations of the array of light sensing elements;
one or more analog-to-digital converters respectively coupled to columns of the array of light sensing elements and configured to digitize output signals read out from the array of light sensing elements to generate digital output pixel values; and
a memory configured to store at least one frame of digital output pixel reset values,
wherein the timing and control circuit is configured to reset the light sensing elements in the array at substantially the same time and to read out respective pixel reset values associated with the light sensing elements, the pixel reset values being stored in the memory; and the timing and control circuit is further configured to control the array of light sensing elements to integrate incident light at substantially the same time and for substantially the same time duration and to read out light dependent pixel values associated with the light sensing elements; and
wherein the pixel reset values are cancelled from the corresponding light dependent pixel values for each of the light sensing elements in the array to generate correlated double sampling (CDS) corrected digital output pixel values.

2. The image sensing device of claim 1, wherein the reset pixel value for each light sensing element is subtracted from the light dependent pixel value of the corresponding light sensing element to generate the CDS corrected digital output pixel value for that light sensing element.

3. The image sensing device of claim 1, wherein the reset pixel value for each light sensing element and the light dependent pixel value of the corresponding light sensing element are used as two points on a straight line representing voltage of the photodiode as a function of time, and wherein the CDS corrected digital output pixel value is calculated based on interpolation or extrapolation along the straight line.

4. The image sensing device of claim 1, further comprising:
a correlated double sampling control and cancellation circuit configured to generate control signals to the memory to retrieve stored digital output pixel reset values and to perform cancellation of the pixel reset values from the light dependent pixel values to generate the CDS corrected digital output pixel values.

5. The image sensing device of claim 4, wherein the array of light sensing elements, the memory and the correlated double sampling control and cancellation circuit are formed on a same integrated circuit.

6. The image sensing device of claim 4, wherein the array of light sensing elements is formed on a first integrated circuit separate from a second integrated circuit on which the correlated double sampling control and cancellation circuit and the memory are formed.

7. The image sensing device of claim 1, wherein the array of light sensing elements and the memory are formed on a same integrated circuit.

8. The image sensing device of claim 1, wherein the array of light sensing elements is formed on a first integrated circuit separate from a second integrated circuit on which the memory is formed.

9. The image sensing device of claim 1, wherein each light sensing element comprises four control transistors including a transfer gate transistor configured to transfer charges on the photodiode to a floating diffusion when asserted, a reset transistor configured to reset the light sensing element when both the reset transistor and the transfer gate transistor are asserted, a third transistor to pass the output signal of the floating diffusion to a row select transistor, and the row select transistor configured to control readout of the pixel values to an output node of the light sensing element.

10. The image sensing device of claim 1, wherein each light sensing element comprises five control transistors including a transfer gate transistor configured to transfer charges on the photodiode to a floating diffusion when asserted, a reset transistor configured to reset the light sensing element when both the reset transistor and transfer gate transistor are asserted, an anti-blooming transistor configured to reset the photodiode when asserted, a fourth transistor to pass the output signal of the floating diffusion to a row select transistor, and the row select transistor configured to control readout of pixel values to an output node of the light sensing element.

11. The image sensing device of claim 1, wherein the CDS corrected digital output pixel values are stored in the memory.

12. The image sensing device of claim 11, wherein the memory stores the CDS corrected digital output pixel values for multi-frame image processing.

13. The image sensing device of claim 1, wherein the light sensing elements in the array are coated with a color filter pattern to generate output signals indicative of a color filter.

14. The image sensing device of claim 1, wherein the timing and control circuit is configured to maintain substantially the same integration time for resetting the light sensing elements in the array.

15. The image sensing device of claim 1, further comprising:
a two dimensional array of selectively transmissive filters superimposed and in registration with each of said light sensing elements, the array of selectively transmissive filters includes a first group of filters associated with a first group of photodiodes for capturing a first color spectrum of visible light and a second group of filters associated with a second group of photodiodes for capturing a second color spectrum of visible light.

16. The image sensing device of claim 1, wherein the timing and control circuit is operative to implement an active reset, in which the control circuit monitors the reset level of each light sensing element, and changes a bias condition of the reset transistor to minimize reset level variations between light sensing elements.

17. A method in an image sensing device, comprising:
providing a two-dimensional array of light sensing elements, each light sensing element comprising a photodiode and a plurality of control transistors, each photodiode generating an output signal indicative of an intensity level of light impinging on the photodiode, and the plurality of control transistors being configured to control reset, charge transfer and row select operations of the array of light sensing elements;
resetting the array of light sensing elements at substantially the same time;
reading out the pixel reset values associated with the light sensing elements;
storing the pixel reset values;
integrating charges at the photodiodes of the array of light sensing elements indicative of incident light at substantially the same time and for substantially the same time duration;
reading out the light dependent pixel values associated with the light sensing elements; and
cancelling the pixel reset values from the corresponding light dependent pixel values for each of the light sensing elements in the array to generate correlated double sampling (CDS) corrected digital output pixel values.

18. The method of claim 17, wherein resetting the array of light sensing elements at substantially the same time comprises:
resetting the photodiodes of the light sensing elements at substantially the same time; and
resetting a floating diffusion associated with each light sensing elements.

19. The method of claim 17, wherein the integration time for resetting the array of light sensing elements is substantially the same for each light sensing element in the array.

* * * * *